US012791893B2

(12) United States Patent
Wu et al.

(10) Patent No.: US 12,791,893 B2
(45) Date of Patent: Nov. 10, 2026

(54) REFLECTIVE DISPLAY PANEL

(71) Applicant: HannStar Display Corporation, Taipei City (TW)

(72) Inventors: Chao-Yun Wu, Taipei City (TW); Wei-Chih Hsu, Taipei City (TW); Yen-Chung Chen, Taipei City (TW)

(73) Assignee: HannStar Display Corporation, Taipei City (TW)

( * ) Notice: Subject to any disclaimer, the term of this patent is extended or adjusted under 35 U.S.C. 154(b) by 197 days.

(21) Appl. No.: 18/943,846

(22) Filed: Nov. 11, 2024

(65) Prior Publication Data

US 2025/0370294 A1 Dec. 4, 2025

(30) Foreign Application Priority Data

May 31, 2024 (TW) ................................ 113120129

(51) Int. Cl.

*G02F 1/1335* (2006.01)
*G02F 1/13363* (2006.01)
*G02F 1/1343* (2006.01)

(52) U.S. Cl.

CPC .. *G02F 1/133528* (2013.01); *G02F 1/133553* (2013.01); *G02F 1/133638* (2021.01); *G02F 1/13439* (2013.01); *G02F 2413/01* (2013.01); *G02F 2413/05* (2013.01)

(58) Field of Classification Search

CPC ......... G02F 1/133553; G02F 1/133638; G02F 1/133528
USPC ........................................................... 349/96
See application file for complete search history.

(56) References Cited

U.S. PATENT DOCUMENTS

2007/0236631 A1* 10/2007 Ohtani .................... G02B 1/111 359/489.02
2011/0058127 A1* 3/2011 Toyooka .............. G02B 5/3025 427/547
2017/0357112 A1* 12/2017 Shibahara ............. G02F 1/1335
2022/0382102 A1* 12/2022 Zhong .................. C09K 19/601
(Continued)

FOREIGN PATENT DOCUMENTS

TW 200426447 12/2004
TW 202248386 12/2022
TW 202313859 4/2023
(Continued)

OTHER PUBLICATIONS

"Notice of allowance of Taiwan Counterpart Application", issued on Jan. 22, 2025, p. 1-p. 4.

*Primary Examiner* — Christopher M Raabe
(74) *Attorney, Agent, or Firm* — JCIPRNET

(57) ABSTRACT

A reflective display panel including a first substrate, a second substrate, a liquid crystal layer, a pixel driving layer and a polarizer is provided. The first substrate and the second substrate are arranged to be overlapped with each other. The liquid crystal layer is disposed between the first substrate and the second substrate. The pixel driving layer is disposed on the first substrate and is provided with a reflective layer. The polarizer is disposed on a side of the liquid crystal layer facing away from the reflective layer and overlaps the liquid crystal layer. A maximum phase retardation of the liquid crystal layer is greater than or equal to 85 nm and less than or equal to 115 nm. A single hue b* of the polarizer is greater than or equal to 0 and less than or equal to 3.5.

10 Claims, 3 Drawing Sheets

10

(56) References Cited

U.S. PATENT DOCUMENTS

2025/0215231 A1* 7/2025 Suga .................... G02B 5/3075
2026/0010033 A1* 1/2026 Wu ................... G02F 1/133514

FOREIGN PATENT DOCUMENTS

TW 202330657 8/2023
TW 202411078 3/2024

* cited by examiner

REFLECTIVE DISPLAY PANEL

CROSS-REFERENCE TO RELATED APPLICATION

This application claims the priority benefit of Taiwan application serial no. 113120129, filed on May 31, 2024. The entirety of the above-mentioned patent application is hereby incorporated by reference herein and made a part of this specification.

BACKGROUND

Technical Field

The disclosure relates to a display panel, and more particularly, to a reflective display panel.

Description of Related Art

Reflective display panels have gained advantages in many applications due to their low power consumption. In current product applications, reflective display panels are often preferred to have a white background color, such as in electronic labels or e-readers. However, reflective display panels generally equipped with circular polarizers tend to have a yellowish background color, which affects the display.

SUMMARY

The disclosure provides a reflective display panel whose background color is closer to white.

A reflective display panel in the disclosure includes a first substrate, a second substrate, a liquid crystal layer, a pixel driving layer and a polarizer. The first substrate and the second substrate are overlapped with each other. The liquid crystal layer is disposed between the first substrate and the second substrate. The pixel driving layer is disposed on the first substrate and is provided with a reflective layer. The polarizer is disposed on a side of the liquid crystal layer facing away from the reflective layer and overlaps the liquid crystal layer. A maximum phase retardation of the liquid crystal layer is greater than or equal to 85 nm and less than or equal to 115 nm. A single hue b* of the polarizer is greater than or equal to 0 and less than or equal to 3.5.

In an embodiment of the disclosure, the reflective display panel further includes a quarter-wave plate disposed between the polarizer and the liquid crystal layer.

In an embodiment of the disclosure, an included angle between an absorption axis of the polarizer and an optical axis of the quarter-wave plate of the reflective display panel is in a range of 40 degrees to 50 degrees.

In an embodiment of the disclosure, the reflective layer of the reflective display panel is a plurality of reflective electrodes.

In an embodiment of the disclosure, the reflective display panel further includes a common electrode layer disposed on the first substrate or the second substrate. The reflective electrodes and the common electrode layer are suitable for being enabled to modulate a phase retardation of the liquid crystal layer. The liquid crystal layer has the maximum phase retardation when the reflective electrodes and the common electrode layer are not enabled. The reflective display panel displays a white screen. A hue b* of the white screen is greater than or equal to −2 and less than or equal to 0.

In an embodiment of the disclosure, a hue a* of the white screen of the reflective display panel is greater than or equal to −5.5 and less than or equal to −3.5.

In an embodiment of the disclosure, the single hue b* of the polarizer of the reflective display panel is greater than or equal to 0 and less than or equal to 2, and the maximum phase retardation of the liquid crystal layer is greater than 105 nm and less than or equal to 115 nm.

In an embodiment of the disclosure, the single hue b* of the polarizer of the reflective display panel is greater than 2 and less than or equal to 2.5, and the maximum phase retardation of the liquid crystal layer is greater than 95 nm and less than or equal to 105 nm.

In an embodiment of the disclosure, the single hue b* of the polarizer of the reflective display panel is greater than 2.5 and less than or equal to 3.5, and the maximum phase retardation of the liquid crystal layer is greater than or equal to 85 nm and less than or equal to 95 nm.

In an embodiment of the disclosure, the maximum phase retardation of the reflective display panel is (ne−no)d. ne is an extraordinary refractive index of the liquid crystal layer. no is an ordinary refractive index of the liquid crystal layer. d is a thickness of the liquid crystal layer in a thickness direction.

Based on the above, in a reflective display panel according to an embodiment of the disclosure, a maximum phase retardation of a liquid crystal layer is in a range of 85 nm to 115 nm. A single hue b* of a polarizer disposed on a side of the liquid crystal layer facing away from a reflective layer is in a range of 0 to 3.5. Through various combinations of the maximum phase retardation of the liquid crystal layer and the single hue b* of the polarizer, a problem of yellowish background color of the reflective display panel may be significantly improved. Meanwhile, the display contrast of the reflective display panel may also be improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
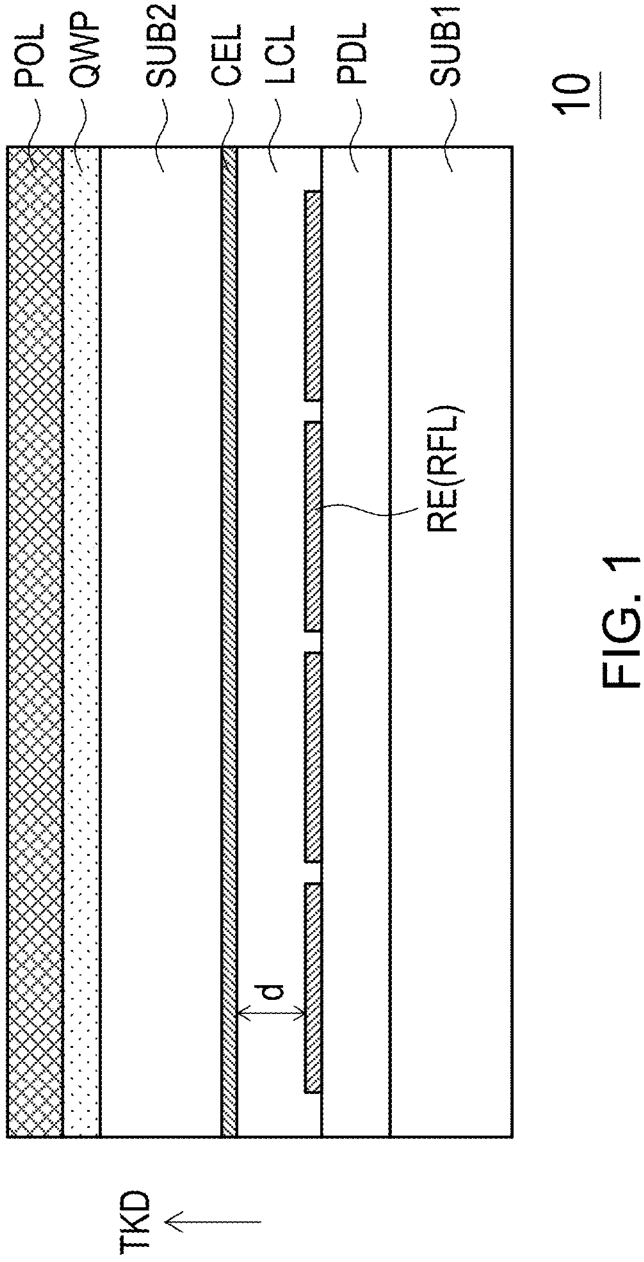
FIG. 1 a schematic cross-sectional view of a reflective display panel according to an embodiment of the disclosure.

Reference will now be made in detail to the exemplary embodiments of the disclosure, and examples of the exemplary embodiments are illustrated in the accompanying drawings.

Whenever possible, the same reference numerals are used in the drawings and descriptions to indicate the same or similar parts.

FIG. 1 a schematic cross-sectional view of a reflective display panel according to an embodiment of the disclosure.

Figure 2:
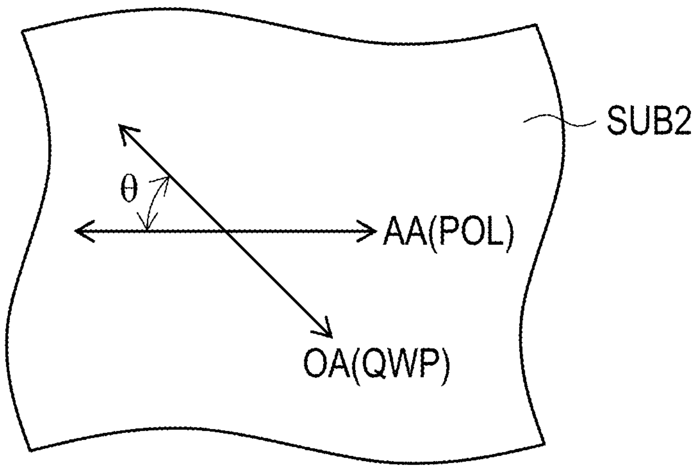
FIG. 2 is a schematic diagram of the axial relationship between an absorption axis of a polarizer and an optical axis of a quarter-wave plate of FIG. 1.
Figure 3:
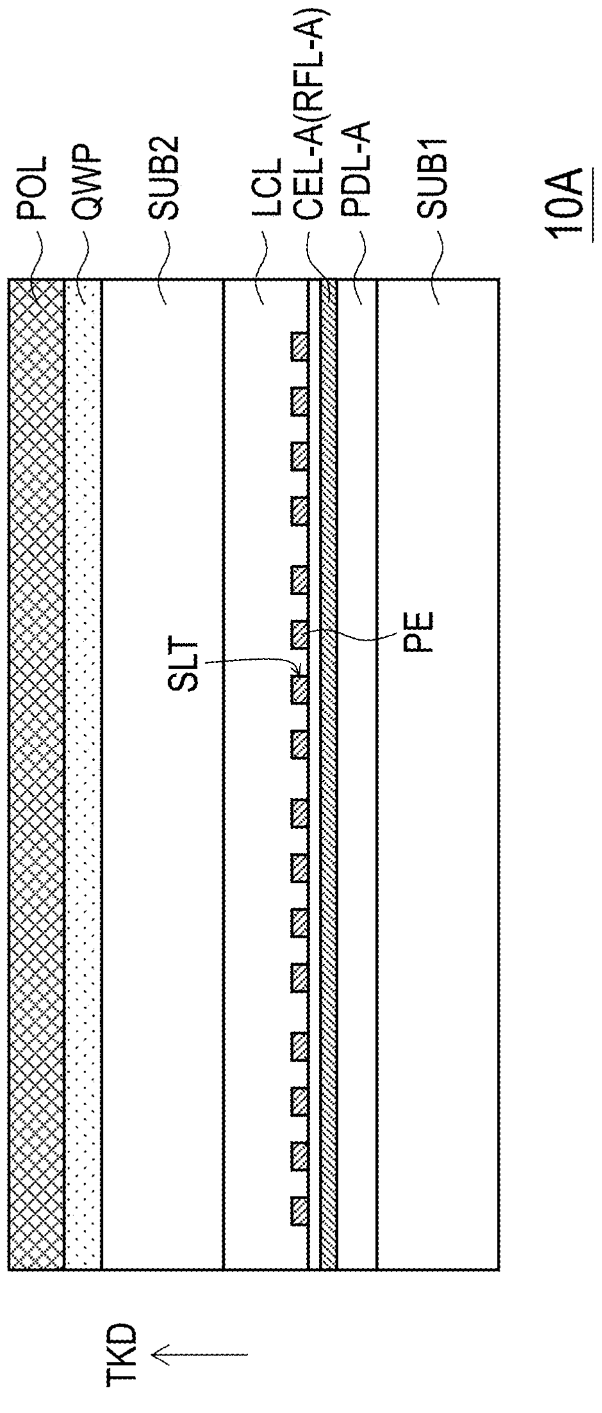
FIG. 3 is a schematic cross-sectional view of a reflective display panel according to another embodiment of the disclosure.

FIG. 2 is a schematic diagram of the axial relationship between an absorption axis of a polarizer and an optical axis of a quarter-wave plate of FIG. 1. FIG. 3 is a schematic cross-sectional view of a reflective display panel according to another embodiment of the disclosure. Referring to FIG. 1, a reflective display panel 10 includes a first substrate SUB1, a second substrate SUB2, a liquid crystal layer LCL and a pixel driving layer PDL. The first substrate SUB1 and the second substrate SUB2 are arranged to overlap each other, and the liquid crystal layer LCL is arranged between the first substrate SUB1 and the second substrate SUB2. The aforementioned overlapping relationship means, for example, that the first substrate SUB1 and the second substrate SUB2 overlap each other along a thickness direction TKD of the liquid crystal layer LCL.

The pixel driving layer PDL is disposed on the first substrate SUB1 and is provided with a reflective layer RFL. For example, the pixel driving layer PDL may be further provided with a plurality of signal lines (not illustrated) and a plurality of active devices (not illustrated). The plurality of signal lines may include a plurality of data lines and a plurality of scan lines. The data lines and the scan lines can define a plurality of pixel areas of the reflective display panel 10, and the pixel areas can be respectively provided with a plurality of the aforementioned active devices. Each active device can be electrically connected to a corresponding data line and a scan line. In the embodiment, the reflective layer RFL can be a plurality of reflective electrodes RE, and each reflective electrode RE can be electrically connected to an active device, but the disclosure is not limited thereto.

In the embodiment, the second substrate SUB2 can be provided with a common electrode layer CEL. The common electrode layer CEL and the reflective electrode RE are suitable for being enabled to modulate a phase retardation of the liquid crystal layer LCL. The common electrode layer CEL is, for example, a light-transmitting electrode, and the material of the light-transmitting electrode includes metal oxide, such as indium tin oxide, indium zinc oxide, aluminum tin oxide, aluminum zinc oxide, or other suitable oxide, or a stacked layer of at least two of the above. For example, in the embodiment, the liquid crystal layer LCL can be driven in a twisted nematic (TN) mode or an electrically controlled birefringence (ECB) mode.

It should be noted first that the liquid crystal layer LCL may have a maximum phase retardation when the reflective electrode RE and the common electrode layer CEL are not enabled, and the reflective display panel 10 displays a white screen at the time. The aforementioned maximum phase retardation is, for example, defined by (ne−no)d, where ne is an extraordinary refractive index of the liquid crystal layer LCL, no is an ordinary refractive index of the liquid crystal layer LCL, and d is a thickness of the liquid crystal layer LCL in a thickness direction TKD.

However, the disclosure is not limited thereto. In another modified embodiment, the pixel driving layer PDL-A of a reflective display panel 10A may be further provided with a common electrode layer CEL-A (as shown in FIG. 3). That is, the common electrode layer CEL-A is disposed on the first substrate SUB1. Specifically, the common electrode layer CEL-A can simultaneously serve as a reflective layer RFL-A of the reflective display panel 10A, i.e., the common electrode layer CEL-A can be a reflective electrode. Therefore, in the modified embodiment, the reflective electrode RE in FIG. 1 can be replaced by a pixel electrode PE made of a transparent conductive material, and the pixel electrode PE can have a plurality of micro-slits SLT. More specifically, in the modified embodiment, the liquid crystal layer LCL is, for example, driven in a fringe-field switching (FFS) mode. In other modified embodiments, the liquid crystal layer LCL may also be driven in an in-plane switching (IPS) mode.

Furthermore, the reflective display panel 10 further includes a polarizer POL disposed on a side of the liquid crystal layer LCL facing away from the reflective layer RFL. In the embodiment, the polarizer POL is, for example, disposed on a side surface of the second substrate SUB2 facing away from the liquid crystal layer LCL. It is particularly noted that a quarter-wave plate QWP is further provided between the polarizer POL and the liquid crystal layer LCL. The combination of the polarizer POL and the quarter-wave plate QWP can be used as a circular polarizer for the reflective display panel 10.

Referring to FIG. 1 and FIG. 2, in the embodiment, an included angle θ between orthographic projections of an absorption axis AA of the polarizer POL and an optical axis OA of the quarter-wave plate QWP on the second substrate SUB2 is preferably 45 degrees, but the disclosure is not limited thereto. In other embodiment, the included angle θ may also be any angle within a range of 40 degrees to 50 degrees.

In order to improve a problem of the yellowish background color of current reflective display panels equipped with circular polarizers, the maximum phase retardation of the liquid crystal layer LCL in the embodiment (i.e., the phase retardation of the liquid crystal layer LCL when the common electrode layer CEL and the reflective electrode RE are not enabled), must be greater than or equal to 85 nm and less than or equal to 115 nm, and a single hue b* of the polarizer POL must be greater than or equal to 0 and less than or equal to 3.5. With the above configuration, a hue a* of the white screen of the reflective display panel 10 is greater than or equal to −5.5 and less than or equal to −3.5, and a hue b* of the white screen is greater than or equal to −2 and less than or equal to 0.

It should be noted that the aforementioned hue a* and hue b* are numerical parameters used to define colors in the CIELAB color space. Among them, if the hue a* is a positive value, the color tends toward red as its value increases; if it is a negative value, the color tends toward green as its value decreases. If the hue b* is a positive value, the color tends toward yellow as its value increases; if it is a negative value, the color tends toward bluish as its value decreases. When both hue a* and hue b* are 0, the color is white. In other words, the background color of the reflective display panel 10 of the disclosure does not exhibit a yellowish tint issue.

The following will exemplify the design combination of the single hue b* of some polarizers POL and the maximum phase retardation of the liquid crystal layer LCL. Table 1 shows the display performance of the reflective display panel 10 of the embodiment under different design combinations and the display performance of the reflective display panel of a comparative example.

TABLE 1

| | Comparative example | Combination 1 | Combination 2 | Combination 3 |
|---|---|---|---|---|
| Single hue b* | 3.4 | 3.4 | 2.2 | 1.84 |
| Maximum phase retardation of liquid crystal layer (nm) | 137 | 91 | 97 | 109 |

TABLE 1-continued

| | Comparative example | Combination 1 | Combination 2 | Combination 3 |
|---|---|---|---|---|
| Hue a* | −3.8 | −4.0 | −4.5 | −5.1 |
| Hue b* | 13.9 | −1.2 | −1.1 | −1.0 |
| Display contrast | 24.4 | 24.6 | 24.8 | 25.0 |

Referring to FIG. 1 and table 1, in the first embodiment, the single hue b* of the polarizer POL can be greater than 2.5 and less than or equal to 3.5, and the maximum phase retardation of the liquid crystal layer LCL is greater than or equal to 85 nm and less than or equal to 95 nm. For example, when the single hue b* of the polarizer POL is 3.4 and the maximum phase retardation of the liquid crystal layer LCL is 91 nm, the hue a* and the hue b* of the reflective display panel 10 are −4.0 and −1.2, respectively (i.e., the implementation of combination 1).

Compared with the comparative example in Table 1 (i.e., the implementation conditions of the single hue b* of the polarizer POL is 3.4 and the maximum phase retardation of the liquid crystal layer LCL is 137 nm), the design of combination 1 (i.e., only adjusting the maximum phase retardation of the liquid crystal layer LCL) may improve the hue b* of the white screen of the reflective display panel from 13.9 to −1.2 (i.e., the background color is corrected from yellowish to white).

In the second embodiment, the single hue b* of the polarizer POL can be greater than 2 and less than or equal to 2.5, and the maximum phase retardation of the liquid crystal layer LCL is greater than 95 nm and less than or equal to 105 nm. For example, when the single hue b* of the polarizer POL is 2.2 and the maximum phase retardation of the liquid crystal layer LCL is 97 nm, the hue a* and the hue b* of the reflective display panel 10 are −4.5 and −1.1, respectively (i.e., the implementation of combination 2).

Compared with the comparative example in Table 1, the design of combination 2 may improve the hue b* of the white screen of the reflective display panel from 13.9 improved to −1.1 (i.e., the background color was corrected from yellowish to white) by simultaneously adjusting the maximum phase retardation of the liquid crystal layer LCL and the single hue b* of the polarizer POL. For example, the single hue b* of the polarizer POL can be changed by adjusting the concentration of iodine or dye molecules adsorbed in the polarizer, but the disclosure is not limited thereto.

In the third embodiment, the single hue b* of the polarizer POL is greater than or equal to 0 and less than or equal to 2, and the maximum phase retardation of the liquid crystal layer LCL is greater than 105 nm and less than or equal to 115 nm. For example, when the single hue b* of the polarizer POL is 1.84 and the maximum phase retardation of the liquid crystal layer LCL is 109 nm, the hue a* and the hue b* of the reflective display panel 10 are −5.1 and −1.0, respectively (i.e., the implementation of combination 3).

Compared with the comparative example in Table 1, the design of combination 3 may improve the hue b* of the white screen of the reflective display panel from 13.9 improved to −1.0 (i.e., the background color was corrected from yellowish to white) by simultaneously adjusting the maximum phase retardation of the liquid crystal layer LCL and the single hue b* of the polarizer POL.

It can be seen from the performance of the three designs of combination 1, combination 2 and combination 3 that the larger the maximum phase retardation of the liquid crystal layer LCL (for example, from 91 nm to 109 nm), the smaller the value of single hue b* of the polarizer POL (for example, from 3.4 to 1.84), such that the value of the hue b* of the white screen of the reflective display panel 10 can be closer to 0. It is particularly noted that the display contrast of the reflective display panel 10 may be further improved if the maximum phase retardation of the liquid crystal layer LCL increases as the value of the single hue b* of the polarizer POL decreases.

To sum up, in a reflective display panel according to an embodiment of the disclosure, a maximum phase retardation of a liquid crystal layer is in a range of 85 nm to 115 nm. A single hue b* of a polarizer disposed on a side of the liquid crystal layer facing away from a reflective layer is in a range of 0 to 3.5. Through various combinations of the maximum phase retardation of the liquid crystal layer and the single hue b* of the polarizer, a problem of yellowish background color of the reflective display panel may be significantly improved. Meanwhile, the display contrast of the reflective display panel may also be improved. Finally, it should be noted that the present invention is not limited to use in a reflective display panel. The present invention is also applicable to any display panel including reflective pixel structures such as a transflective display panel.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A reflective display panel, comprising:

a first substrate and a second substrate, overlapped with each other;

a liquid crystal layer, disposed between the first substrate and the second substrate;

a pixel driving layer, disposed on the first substrate and provided with a reflective layer; and a polarizer, disposed on a side of the liquid crystal layer facing away from the reflective layer, and overlapping the liquid crystal layer, wherein a maximum phase retardation of the liquid crystal layer is greater than or equal to 85 nm and less than or equal to 115 nm, and a single hue b* of the polarizer is greater than or equal to 0 and less than or equal to 3.5.

2. The reflective display panel according to claim 1, further comprising:

a quarter-wave plate, disposed between the polarizer and the liquid crystal layer.

3. The reflective display panel according to claim 2, wherein an included angle between an absorption axis of the polarizer and an optical axis of the quarter-wave plate is in a range of 40 degrees to 50 degrees.

4. The reflective display panel according to claim 3, wherein the reflective layer is a plurality of reflective electrodes.

5. The reflective display panel according to claim 4, further comprising:

a common electrode layer, disposed on the first substrate or the second substrate, wherein the reflective electrodes and the common electrode layer are suitable for being enabled to modulate a phase retardation of the liquid crystal layer, the liquid crystal layer has the maximum phase retardation when the reflective electrodes and the common electrode layer are no enabled, the reflective display panel displays a white screen, and a hue b* of the white screen is greater than or equal to −2 and less than or equal to 0.

6. The reflective display panel according to claim 5, wherein a hue a* of the white screen is greater than or equal to −5.5 and less than or equal to −3.5.

7. The reflective display panel according to claim 1, wherein a single hue b* of the polarizer is greater than or equal to 0 and less than or equal to 2, and the maximum phase retardation of the liquid crystal layer is greater than 105 nm and less than or equal to 115 nm.

8. The reflective display panel according to claim 1, wherein the single hue b* of the polarizer is greater than 2 and less than or equal to 2.5, and the maximum phase retardation of the liquid crystal layer is greater than 95 nm and less than or equal to 105 nm.

9. The reflective display panel according to claim 1, wherein the single hue b* of the polarizer is greater than 2.5 and less than or equal to 3.5, and the maximum phase retardation of the liquid crystal layer is greater than 85 nm and less than or equal to 95 nm.

10. The reflective display panel according to claim 1, wherein the maximum phase retardation is (ne−no)d, ne is an extraordinary refractive index of the liquid crystal layer, no is an ordinary refractive index of the liquid crystal layer, and d is a thickness of the liquid crystal layer in a thickness direction.

* * * * *